United States Patent
Herron et al.

(10) Patent No.: US 12,536,844 B1
(45) Date of Patent: Jan. 27, 2026

(54) VEHICLE DIAGNOSTIC SCAN DEVICE WITH SELECTIVELY SEARCHABLE RESULTS

(71) Applicant: Opus IVS, Inc., Ann Arbor, MI (US)

(72) Inventors: Brian J. Herron, Dexter, MI (US); Alexander P. Walsh, Conception Bay South (CA); James T. Fish, Birmingham, MI (US)

(73) Assignee: Opus IVS, Inc., Dexter, MI (US)

( * ) Notice: Subject to any disclaimer, the term of this patent is extended or adjusted under 35 U.S.C. 154(b) by 532 days.

(21) Appl. No.: 17/967,223

(22) Filed: Oct. 17, 2022

(51) Int. Cl.
  *G07C 5/00* (2006.01)
  *G07C 5/08* (2006.01)

(52) U.S. Cl.
  CPC ............ *G07C 5/008* (2013.01); *G07C 5/006* (2013.01); *G07C 5/0808* (2013.01); *G07C 5/0825* (2013.01); *G07C 2205/02* (2013.01)

(58) Field of Classification Search
  None
  See application file for complete search history.

(56) References Cited

U.S. PATENT DOCUMENTS

| | | | |
|---|---|---|---|
| 2008/0140281 A1* | 6/2008 | Morris | G07C 5/008 701/31.4 |
| 2010/0174446 A1* | 7/2010 | Andreasen | G07C 5/0808 701/31.4 |
| 2013/0317694 A1* | 11/2013 | Merg | G07C 5/008 701/31.6 |
| 2019/0050458 A1* | 2/2019 | Merg | G06F 16/2471 |
| 2019/0258727 A1* | 8/2019 | Schmotzer | G06F 40/242 |
| 2023/0325705 A1* | 10/2023 | Kim | G06Q 10/20 706/12 |

* cited by examiner

*Primary Examiner* — James J Lee
*Assistant Examiner* — Andrew Sang Kim
(74) *Attorney, Agent, or Firm* — Gardner, Linn, Burkhart & Ondersma LLP

(57) ABSTRACT

A system and method of diagnosing a vehicle electronic system and searching for relevant vehicle information pertaining thereto includes a vehicle diagnostic computer tool configured to operate in a mode to scan a vehicle to obtain diagnostic scan data, obtaining a plurality of diagnostic scan data results from the electronic system of the vehicle with the vehicle diagnostic computer tool using a diagnostic scanning program, designating particular ones of the diagnostic scan data results using the vehicle diagnostic computer tool, and performing a search for vehicle information related to the designated particular ones of the diagnostic scan data results. The diagnostic scan data results for searching can be designated by an operator via a listing on the computer tool, or can be automatically designated by the computer tool by way of input criteria entered into the vehicle diagnostic computer tool.

19 Claims, 6 Drawing Sheets

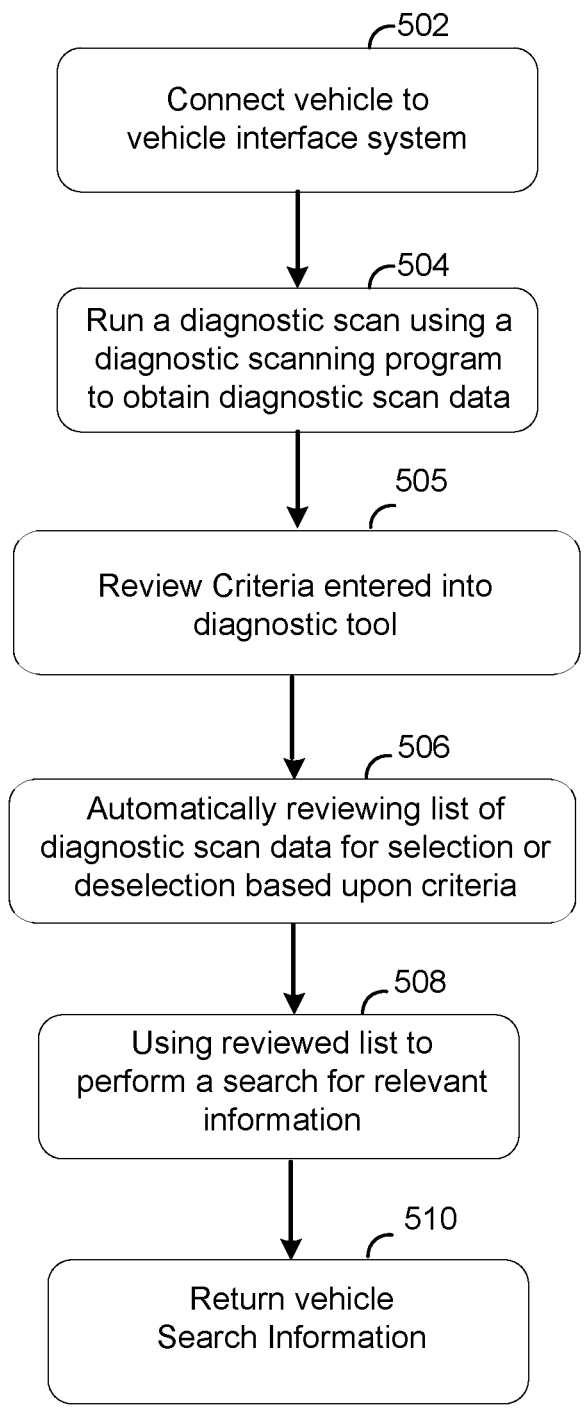

VEHICLE DIAGNOSTIC SCAN DEVICE WITH SELECTIVELY SEARCHABLE RESULTS

BACKGROUND OF THE INVENTION

The present invention is directed to a vehicle diagnostic system, and in particular to obtaining diagnostic data while performing a diagnostic scan of the electronic system of a vehicle.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM or an aftermarket diagnostic company. OEM diagnostic applications may include proprietary diagnostic application software exclusive to a particular OEM and may be required for certification purposes to validate repairs performed on a vehicle. The diagnostic applications may provide a report that includes all identified fault codes present on the vehicle at the time of the diagnostic scan.

SUMMARY OF THE INVENTION

The present invention provides a vehicle diagnostic system and method including a vehicle diagnostic computer tool or device for scanning of a vehicle electronic system to obtain diagnostic scan data or information, such as from electronic control units (ECUs). The vehicle diagnostic computer tool is connected with a diagnostic port of the vehicle to be in communication with an electronic system of the vehicle. The diagnostic scan data is obtained, such as DTCs that are reported by the vehicle's electronic system utilizing a diagnostic scanning program. The detected DTCs are arranged into a listing comprising a standard code and title format that may be presented to and reviewed by a user. The user is then able to select or unselect individual results from the scan. The resultant selected scan data results may then be submitted for a search, such as to obtain repair information via an external search engine or database. In this way, the user is able to exclude selected diagnostic scan data results from the repair search to thereby prevent receiving information that is not relevant to the intended repair. In an alternative configuration, the listing of diagnostic scan data is automatically parsed based on search terms entered by the user.

In an aspect of the present invention, a method of diagnosing a vehicle electronic system and searching for relevant vehicle information pertaining thereto comprises providing a vehicle diagnostic system comprising a vehicle diagnostic computer tool configured to operate in a mode to scan a vehicle to obtain diagnostic scan data, connecting the vehicle diagnostic computer tool with a diagnostic port of the vehicle to be in communication with an electronic system of the vehicle, obtaining a plurality of diagnostic scan data results from the electronic system of the vehicle with the vehicle diagnostic computer tool using a diagnostic scanning program, designating particular ones of the diagnostic scan data results using the vehicle diagnostic computer tool, and performing a search for vehicle information related to the designated particular ones of the diagnostic scan data results.

In accordance with a particular embodiment, the method further comprises obtaining vehicle identification data, such as make, model, year and/or other data of the vehicle, using the vehicle diagnostic computer tool, and searching for relevant vehicle information related to the designated diagnostic scan data results based on the vehicle identifier data, such as to correlate DTCs with a given manufacturer.

In accordance with another particular embodiment of the invention, the method comprises providing a list of the diagnostic scan data results on a display of the computer tool, whereby an operator is able to designate the particular diagnostic scan data results using the computer tool comprises. The method may further include formatting the diagnostic scan data results prior to providing the list on the display. For example, the diagnostic scan data results may comprise alphanumeric codes that are formatted to include identification titles for displaying.

The diagnostic computer tool is used for searching for vehicle information, such as maintenance and/or repair information, based on the designated scan data results. The search results may be displayed on the display of the computer tool, and may be obtained via an internet search or based on accessing vehicle information from a database, where the database may be a remote database or may be stored in memory on the computer tool.

In another alternative embodiment, the method comprises entering input criteria to the vehicle diagnostic computer tool with the vehicle diagnostic computer tool automatically designating particular ones of the diagnostic scan data results using the vehicle diagnostic computer tool based on the input criteria. In a particular arrangement, the input criteria is entered by an operator.

In accordance with a further aspect of the present invention, a vehicle diagnostic system configured for diagnosing a vehicle electronic system and searching for relevant vehicle information pertaining thereto comprises a vehicle diagnostic computer tool configured to operate in a mode to scan an electronic system of a vehicle to obtain diagnostic scan data, a diagnostic scanning program configured for use with the vehicle diagnostic computer tool to obtain a plurality of diagnostic data scan results from the electronic system of the vehicle, where the vehicle diagnostic computer tool is configured to enable designation of particular ones of the plurality of diagnostic data scan results for searching, and the vehicle diagnostic computer tool is configured to enable searching for vehicle information related to the designated diagnostic data scan results.

In a particular embodiment, the vehicle diagnostic computer tool includes a display and is configured to list the obtained plurality of diagnostic data scan results on the display, with the vehicle diagnostic computer tool being configured to enable an operator to designate the particular ones of the plurality of diagnostic data scan results. In an alternative embodiment, the vehicle diagnostic computer tool includes a scan code selection program that is configured to automatically designate particular ones of the plurality of diagnostic data scan results for searching.

These and other objects, advantages, purposes, and features of this invention will become apparent upon review of the following specification in conjunction with the drawings.

BRIEF DESCRIPTION OF THE DRAWINGS

FIG. 6 is a flow diagram illustrating steps to a method for automatically assessing an electronic system of a vehicle for maintenance needs according to a review criteria and performing a search for relevant information in accordance with the present invention.

DESCRIPTION OF THE PREFERRED EMBODIMENTS

The present invention will now be described with reference to the accompanying figures, wherein the numbered elements in the following written description correspond to like-numbered elements in the figures.

Figure 1:
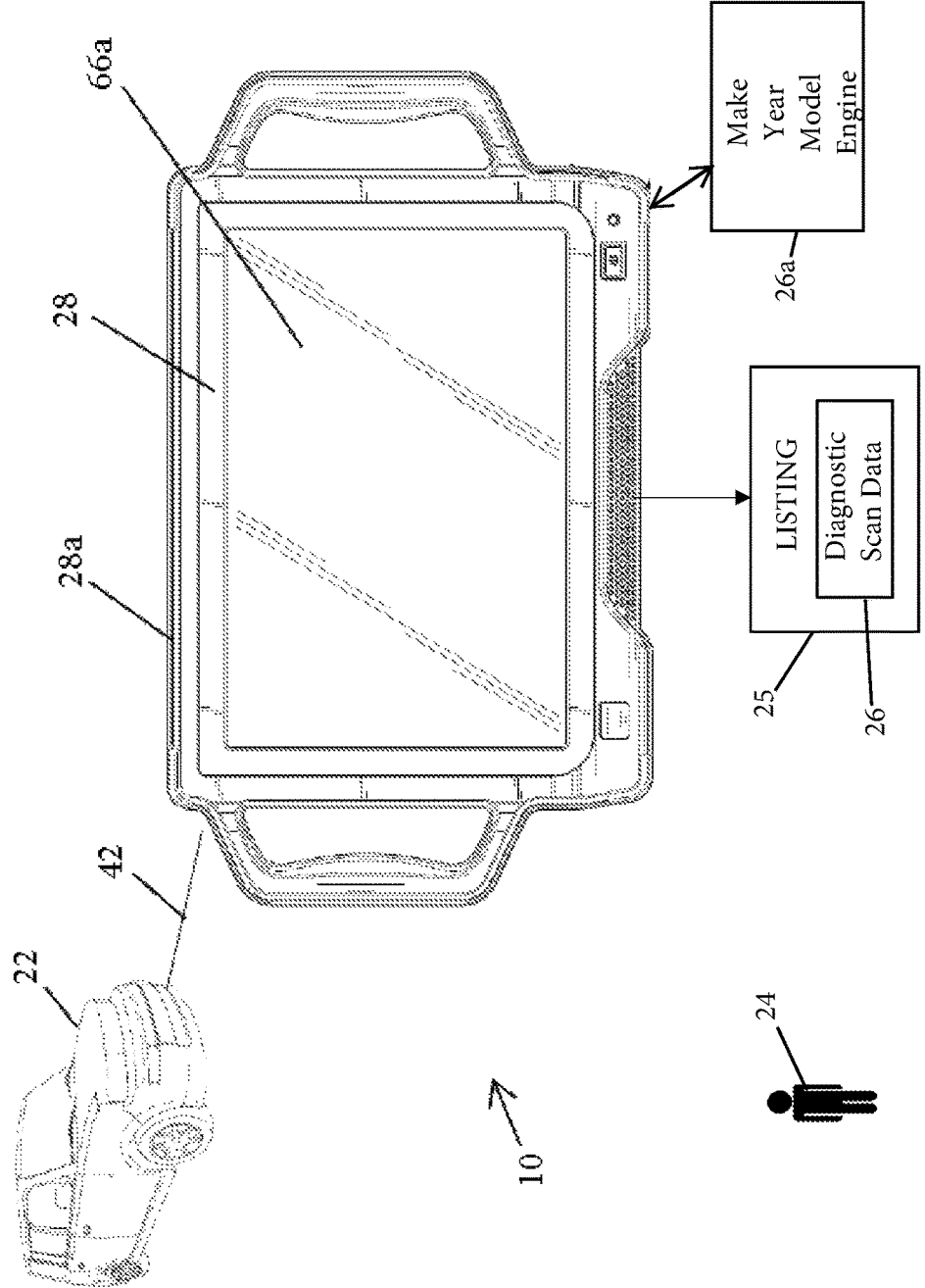
FIG. 1 is a diagram of a vehicle diagnostic system in accordance with the present invention showing a vehicle diagnostic tool connected to the electronic system of a vehicle.
Figure 2:
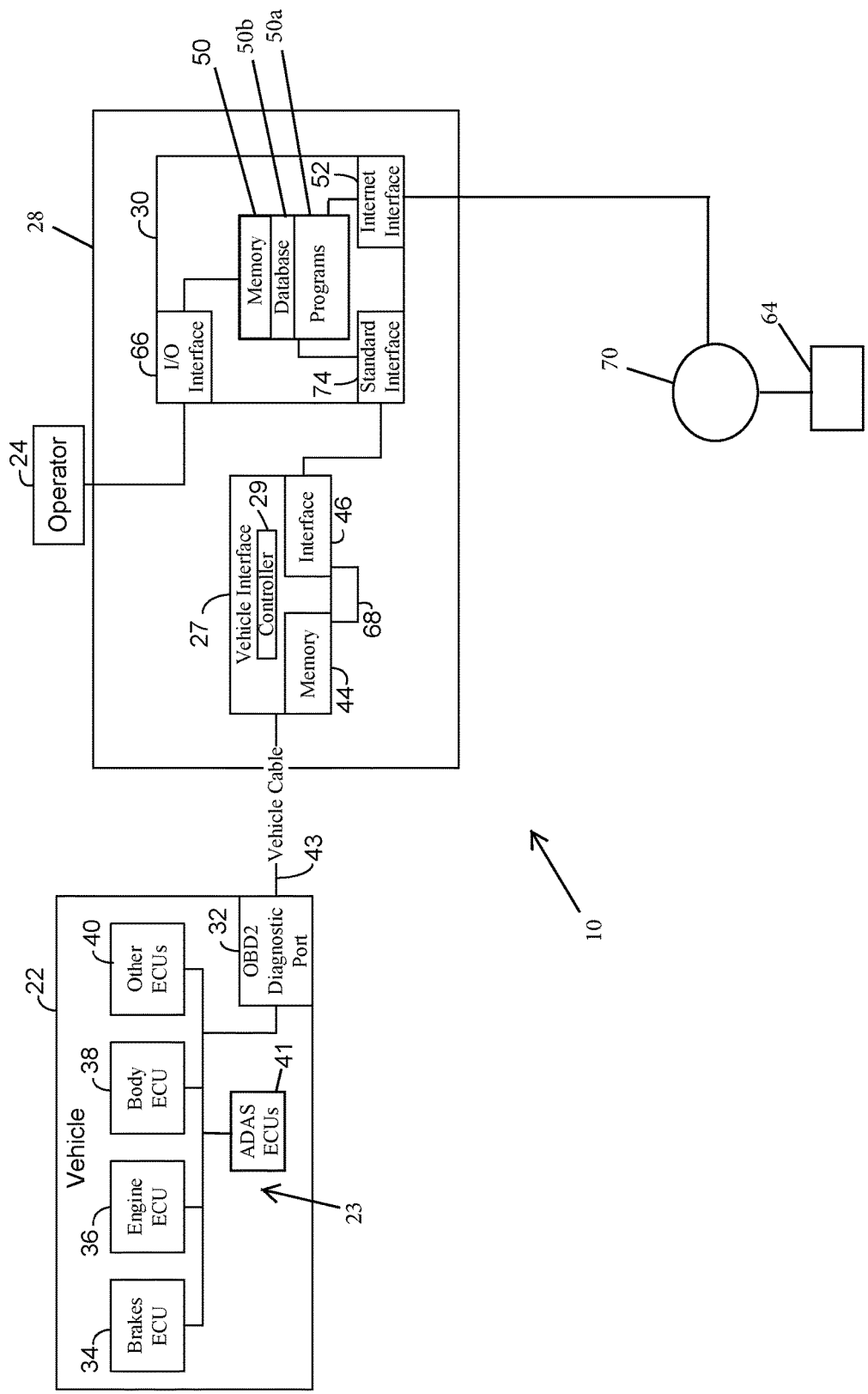
FIG. 2 is a block diagram of the vehicle diagnostic system in accordance with the present invention showing the diagnostic tool in relation to the electronic system of the vehicle.

A vehicle diagnostic system 10 for use with a vehicle 22 is shown for use by a user such as a mechanic or operator 24, such as in an automotive repair facility. System 10 is illustrated in FIGS. 1 and 2 as including a vehicle diagnostic tool 28, which as discussed in more detail below, is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including safety systems such as Adaptive Driver Assistance Systems ("ADAS") ECUs 41, and including other electronic parts and components of vehicle 22. Vehicle diagnostic tool 28 is shown connected with port 32 via vehicle cable 43 and is used to scan the electronic system 23 of vehicle 22 to obtain diagnostic scan data 26, such as to determine any fault codes in the electronic system 23, which may be reported as diagnostic trouble codes ("DTCs") to thereby provide an indication to the mechanic/operator 24 as to what repairs are needed on vehicle 22.

As discussed in more detail below, in accordance with aspects of the present invention, the vehicle diagnostic tool 28 will provide a report or listing 25 to the mechanic/operator 24 of the diagnostic scan data 26, such as on screen 66a of tool 28, where that diagnostic scan data 26 may be formatted by the vehicle diagnostic tool 28 to provide a standard code and title for each DTC. The listing 25 of diagnostic scan data 26 will initially include all fault code data reported by the electronic system 23, including regardless of the type of fault code or when the fault code first was registered in the electronic system 23 such that the listed codes may include those that have been present in the vehicle 22 for an extended time period as well as those that are more recent. In the illustrated embodiment, tool 28 is further configured to enable operator 24 to perform searches on the diagnostic scan data 26, including to locate related maintenance and/or repair information for troubleshooting and/or addressing the specific fault codes reported by the electronic system 23. If a search for maintenance/repair information is performed based on the entire listing 25 of diagnostic scan data 26, it is possible that extraneous and irrelevant information may be included in the search results. For example, if the operator 24 is desiring to obtain information related to a recent fuel system issue, but the scan data 26 includes old fault codes related to a satellite radio, for example, the search could return results related to the satellite radio that are not relevant to the fuel system issue intended to be addressed by operator 24. Accordingly, in the illustrated embodiment, the vehicle diagnostic tool 28 is configured to enable the operator 24 to manually select or deselect individual fault code scan data 26 from the list 25 of fault codes before performing a search for maintenance/repair information. By deselecting any irrelevant and/or erroneous fault code diagnostic scan data 26, the search for maintenance/repair information is based on just relevant diagnostic scan data 26, thereby focusing the return of information to the operator 24. In a further embodiment, a selection/deselection of diagnostic scan data 26 is performed automatically, such as based on search information entered by the operator 24 or based on selected date/time criteria and/or known dissociations between the listed fault codes. Whether manual or automatic (or a combination), the search results are thereby tailored to provide only relevant information to the operator 24.

With reference to FIGS. 1 and 2, the vehicle diagnostic tool 28 in the illustrated embodiment includes a housing 28a containing circuitry, hardware, and software, such as a vehicle interface module 27 coupled with a computer module 30.

In use, tool 28 is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including ADAS ECUs 41, the event data recorder 42, and including other electronic parts and components of vehicle 22. Tool 28 connects with port 32, such as via vehicle cable 43. Vehicle interface 27 includes a controller 29, such as in the form of a processor or micro-processor and interface circuitry to facilitate communication between the ECUs and the vehicle interface 27. The vehicle interface 27 includes a database of vehicle protocols found in a local memory 44 that allows communication with the ECUs of various makes and models of vehicles. Interface module 27 may be configured as an SAE standard J2534 device, such as a device compliant with the J2534-2 standard, or as an ISO compliant or other standard compliant device for supporting and enabling communication with the electronic systems of a vehicle. Vehicle diagnostic tool 28 additionally includes interfaces 46, 74 for communication between interface module 27 and computer module 30, where computer module 30 additionally includes a controller and memory. As understood from FIG. 2, vehicle diagnostic tool 28 may be connected to a remote computer, such as a server 64, such as by an Internet 70 connection with interface 52.

Figure 3:
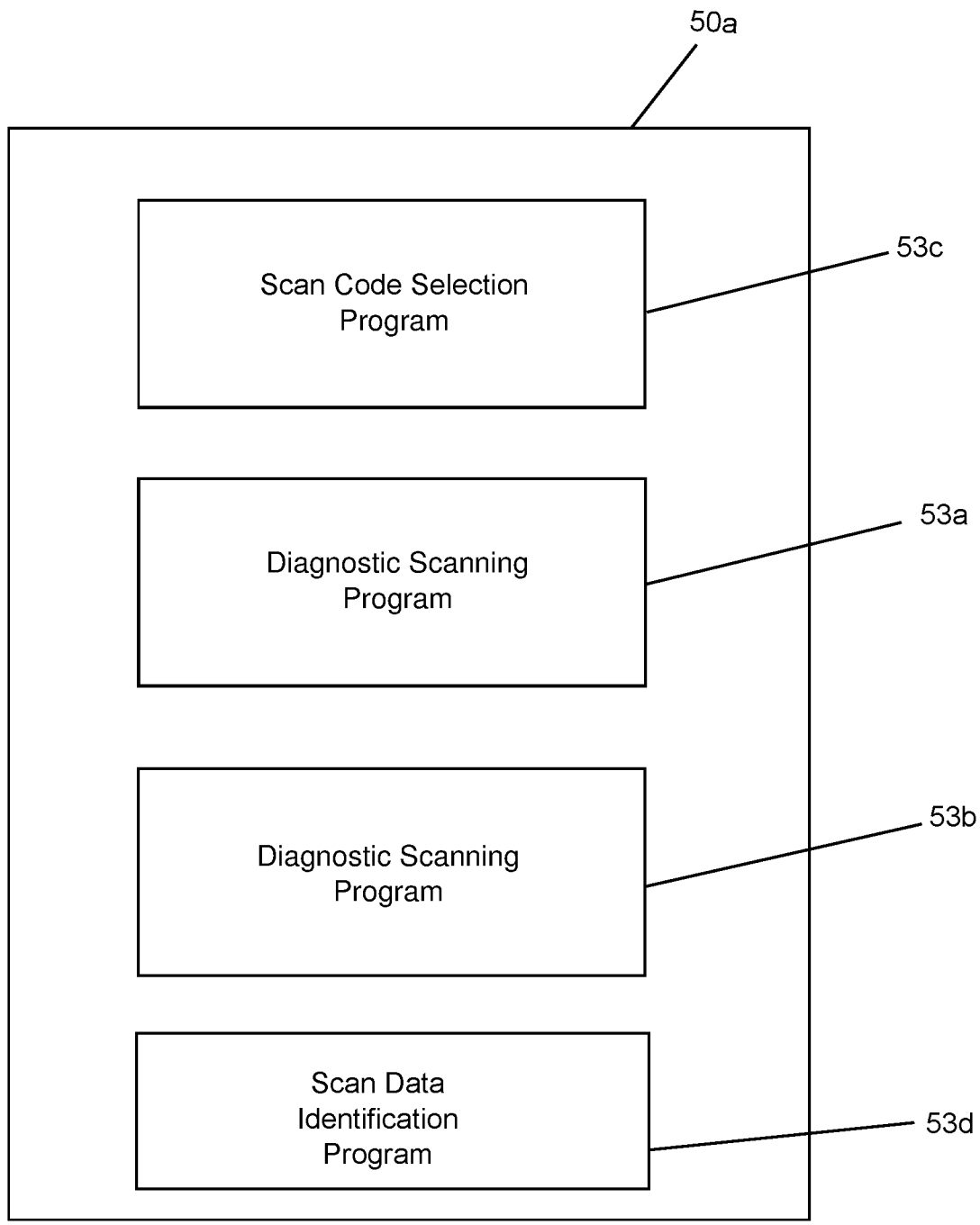
FIG. 3 is a block diagram of a plurality of programs contained within memory of the diagnostic tool of FIGS. 1 and 2 in accordance with the present invention.

Vehicle diagnostic system 10 may be configured to be selectively operable in one of a plurality of different modes, whereby a technician may use the diagnostic tool 28 for vehicle maintenance, diagnosis, programming, and repair as needed. In accordance with an embodiment of the present invention and with reference to FIG. 3, the computer module 30 includes a memory 50 for storing a database 50b and programs 50a, including one or more diagnostic scanning application programs 53a. 53b, as well as a scan code selection program 53c and a scan data identification program 53d. The diagnostic scanning application programs include OEM diagnostic scanning programs 53a and third-party diagnostic scanning programs 53b, and it should be appreciated that multiple such programs may be included for use with multiple different makes and models of vehicles.

In the illustrated embodiment, vehicle diagnostic tool 28 includes one or more commercially available diagnostic scanning programs 53a and 53b that are configured for use with the specific vehicle 22. Although shown as having two diagnostic scanning programs 53a, 53b, it should be appreciated that memory 50 can include additional such programs available for use with various vehicles 22 of different makes and models. Thus, numerous such diagnostic scanning programs 53a. 53b can be stored in memory 50.

An exemplary diagnostic scanning program interfaces with the ECUs of a vehicle to obtain diagnostic scan data 26 fault codes (DTCs) to be ascertained. Data from the diagnostic scanning programs 53a, 53b can be stored in database 50b. An exemplary diagnostic application scanning program comprises a program provided by an automotive manufacturer or a company that supplies diagnostic application programs, such as Opus IVS, Inc., with the diagnostic application scanning tool configured to enable the reading and reporting of fault codes in the electronic system of the vehicle such as may be located in ECUs of the vehicle. In practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the customer's selection of vehicle options. Alternatively, and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22.

The diagnostic scanning programs 53a, 53b are used to retrieve diagnostic trouble codes from ECUs in the vehicle's electronic system 23. That is, the diagnostic scanning programs 53a, 53b are used to diagnose maintenance issues (e.g., a faulty catalytic converter, oxygen sensors failing to switch as expected, lean condition in the engine, which are DTCs indicative of failures in the vehicle components).

In addition to obtaining diagnostic scan data 26, vehicle diagnostic tool 28 may also be used to obtain vehicle identifier data or information 27 (FIG. 1) regarding the vehicle 22, such as the make, year and model of vehicle 22, as well as additional information such as a particular engine, transmission or other component relevant to vehicle 22. In one embodiment the diagnostic tool 28 obtains a vehicle identification number (VIN) upon connection with vehicle 22, with the diagnostic tool 28 being operable to read the VIN from the vehicle 22 via its connection through the OBD2 diagnostic port 32. The vehicle VIN may then be used to determine identifier information 27 regarding the vehicle, such as via a database 50b or a remote VIN database. Still further, diagnostic tool 28 may be operable to directly read identifier data 27, such as the make, model and year of vehicle 22. Alternatively, vehicle identifier data 27 may be acquired through alternative means and directly input by the operator 24, such as by vehicle 22 being visually examined and operator 24 inputting information to tool 28, such as by entering make, model and/or year of vehicle 22 by way of a keyboard or touch screen 66a. Moreover, rather than a lookup VIN database, the system 20 may operatively algorithmically analyze selected alphanumerical characters, such as by position number in the VIN, with the system 20 recognizing based on the particular character and location the presence or absence of particular vehicle systems present on the vehicle, such as being preprogrammed. This may include, for example, an operator initially entering a make and model of a vehicle via interface 66 whereby the system 20 is preconfigured to read particular characters in particular locations of the VIN in order to determine vehicle identifier data 27. As discussed in more detail below, the vehicle identifier data 27 may be used to associate the scan data 26 with a particular original equipment manufacturer ("OEM") for purposes of identifying the scan data 26 and searching regarding particular scan data 26.

As discussed herein, a diagnostic scanning program 53a, 53b interfaces with the ECUs of the vehicle 22 to obtain diagnostic scan data 26 whereby fault codes such as in the form of DTCs are ascertained. As understood with reference to the embodiment of FIG. 4, the obtained diagnostic scan information 26, i.e., the scan data, is presented to the operator 24 in a report or listing 25 via the vehicle diagnostic tool 28, such as in the form of a display listing on screen 66a of tool 28. The presented information may be formatted to provide a standard code and title for each of the obtained fault codes. For example, the diagnostic scan code data 26 may be processed or evaluated by a scan data identification program 53d to provide descriptive information or formatting to the diagnostic scan data 26. It should be appreciated that DTCs may be obtained in the form of an alphanumeric string. For example, a code P0100 may represent a mass or volume air flow circuit malfunction, whereas a code P0301 may represent detection of a misfire in a particular cylinder. Accordingly, scan data identification program 53d may be used to interpret the diagnostic scan data 26 to provide a title and/or standard code for display on screen 66a so as to be readily understandable by operator 24. Moreover, it should be further appreciated that certain DTC codes may be OEM specific, and may even be specific to particular years and models of vehicles from a given OEM. Accordingly, the above noted vehicle identifier data 27 may be used by the scan data identification program 53d to provide the proper descriptive information or formatting to the diagnostic scan data 26. In operation, scan data identification program 53d may be configured to provide formatting and/or descriptive information by way of a reference database 50b associated with tool 28, or may access a remote database, such as at remote computer 64. Still further, algorithms may be employed for providing formatting and/or descriptive information, such as based on the reading of characters in the various positions of the codes, which have known associations directed to, for example, the specific ECU, whether the code is generic or manufacturer specific, the specific vehicle system at issue, and particular fault index.

Figure 4:
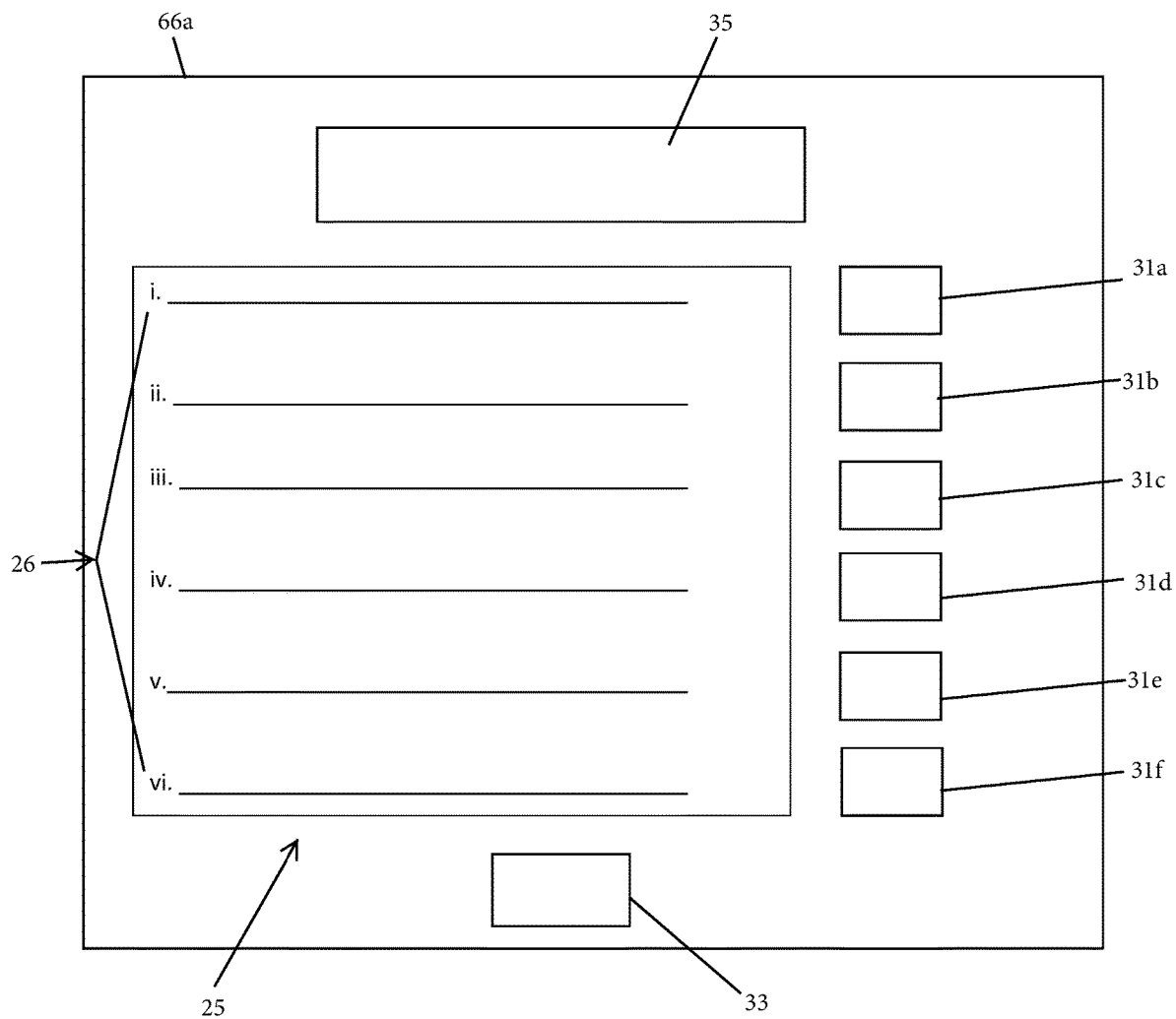
FIG. 4 is a diagram illustrating a listing of individual diagnostic scan data displayed on the diagnostic tool for review by an operator.

As further understood from FIG. 4, operator 24 may manually interact with the provided listing 25 to select particular ones of the listed diagnostic scan data 26 to search or select particular ones of the listed diagnostic scan data 26 to remove from the listing 25—i.e. to deselect. In FIG. 4, for example, the individual ones of diagnostic scan data 26 are illustrated as (i)-(vi) in list 25. As used herein the term selecting may apply to the operator either selecting or deselecting particular ones of the listed diagnostic scan data 26 for purposes of searching. It should be appreciated that operator 24 may manually select diagnostic scan data 26 in numerous particular ways. For example with reference to the illustrated embodiment of FIG. 4, this may include the use of buttons or fields 31a-31f associated with the individual diagnostic scan data 26 (*i*)-26 (*vi*), where the operator selection may be performed by touching one or more of the fields 31*a*-31*f* with screen 66*a* configured as a touch screen. Alternatively, operator 24 may swipe on screen for selection of individual diagnostic scan data 26 (*i*)-26 (*vi*), such as to remove individual listings. Still further, a cursor may be employed or the like for the purposes of selection of individual diagnostic scan data 26 (*i*)-26 (*vi*). Selecting or unselecting an item from the report will allow for the removal of DTCs from any search criterion. The selecting of individual diagnostic scan data 26 (*i*)-26 (*vi*) by operator 24 enables the searching for maintenance or repair information to be focused on diagnostic scan data of particular relevance or interest. That is, while a search for repair/maintenance information based on all reported DTCs may result in unhelpful or extraneous information if there are reported DTCs that are erroneous or irrelevant to a given issue being diagnosed. For example, if an exemplary vehicle 22 has been reporting DTCs related to its satellite radio as well as engine ECUs, if only the engine ECUs are of interest, the maintenance and repair information related to the satellite radio DTCs would be unhelpful to the mechanic/operator 24. Thus, the ability of the mechanic/operator 24 to remove those satellite radio DTCs from the list of DTCs (used for the search) would allow the search to be performed based on only those DTCs of interest to the mechanic/operator 24.

Vehicle diagnostic tool 28 further provides the ability to search for relevant maintenance or repair information after the operator 24 has selected the individual diagnostic scan data 26 (*i*)-26 (*vi*) that are relevant to the problem on vehicle 22 under investigation by operator 24. In the illustrated embodiment, with continued reference to FIG. 4, diagnostic tool 28 may include a search button 33 for submission of the selected diagnostic scan data 26 whereby operator 24 is able to submit the selected diagnostic data 26 for searching regarding information relevant to the repair and/or maintenance related thereto. The search includes, for example, searching for the selected diagnostic data 26 based on or in combination with the ascertained vehicle identification data 27 to associate the specific diagnostic data 26 with the relevant OEM specific information. As noted, the diagnostic data 26 may be specific to a given OEM, accordingly providing the vehicle identification data 27 operates to tailor or aids in tailoring the search for relevant vehicle information pertaining to the selected diagnostic data 26. Although shown as launching a search via search button 33, in an alternative embodiment a search may automatically be launched upon completion of a given step or operation, such as after designating the specific diagnostic data 26 for search.

Diagnostic tool 28 may submit the selected diagnostic scan data 26 to an external online search function via the Internet via internet interface 52. This may include online searching via a public search engine and/or via specialized search engines or databases for automotive maintenance and repair data. Alternatively and/or additionally, database 50*b* of diagnostic tool 28 may include vehicle maintenance and repair information whereby operator 24 interaction with search button 33 submits the selected diagnostic scan data 26 to database 50*b*. Database 50*b* may include, for example, tables or matrices correlating diagnostic data 26 to maintenance and repair information. Whether a search is conducted remotely via internet interface 52 or locally via database 50*b*, vehicle diagnostic tool 28 is operable to return and display maintenance and repair information for use by operator 24 to address the selected diagnostic data 26. For example, the search result information may be presented on screen 66*a* for review by operator 24, or may result in an electronic file that can be printed for a paper copy of the search result information.

In an alternative embodiment, rather than operator 24 perusing the listing 25 of diagnostic scan data 26 and selecting individual diagnostic data 26 for submission to a search, operator 24 may enter search terms in field 35 with diagnostic tool 28 automatically selecting individual ones of diagnostic scan data 26 for searching, such as based on keywords entered in field 35. In the illustrated embodiment diagnostic tool 28 includes a scan code selection program 53*c* that is operable to perform the selection operation on diagnostic scan data 26 based on search terms entered in field 35. For example, an operator 24 may enter the term "misfire" in field 35, whereby scan code selection program 53*c* is operable to parse or filter the listing 25 of diagnostic scan data 26 for fault codes relevant to a misfire condition. For example, scan code selection program 53*c* may include tables or matrixes correlating particular diagnostic data 26 to keywords for parsing or filtering.

In a still further embodiment, the diagnostic tool 28 may perform an automatic review on detected diagnostic scan data based on selected criteria entered by an operator 24. This may include, for example, date/time and/or known dissociations between the listed DTCs. Such criteria could be individually considered or combined. For example, DTCs may include a timestamp for the day and time that they were set. Thus, the automatic review could include automatically deleting DTCs based upon their timestamps. An example would be a vehicle 22 with a set of DTCs with old timestamps (e.g., a malfunctioning satellite radio) and one or more DTCs with more recent timestamps (e.g., engine ECUs). Under the assumption that the more recently set DTCs are of interest to the mechanic/operator 24, the older DTCs are automatically deselected from the list. For example, if the vehicle was brought into a service station for the engine issue, the older DTCs could be automatically deselected.

Another possible criterion for consideration includes a consideration of whether there are known associations or disassociations between any of the DTCs in the list. For example, the list of DTCs can include at least one DTC for wheel and/or brake issues and at least one DTC for a transmission issue. Because there is no relationship between the wheel and/or brake issues and the transmission, one or other could be deselected from the list of DTCs. In other words, an algorithm of scan code selection program 53*c* for automatically reviewing the list of DTCs could include any association links or disassociation links for each of the DTCs. That is, if it is known that certain DTCs have no relationship to each other (e.g., a bad steering angle sensor and a "misfiring" engine), the algorithm could for each DTC include a list of DTCs for which there is no relationship, such that if a DTC (e.g., the misfiring engine) is selected for searching, the list of DTCs with no relationship (and thereby irrelevant) would be automatically deselected (e.g., DTCs related to the bad steering angle sensor are deselected), assuming they are in the current list of DTCs.

Figure 5:
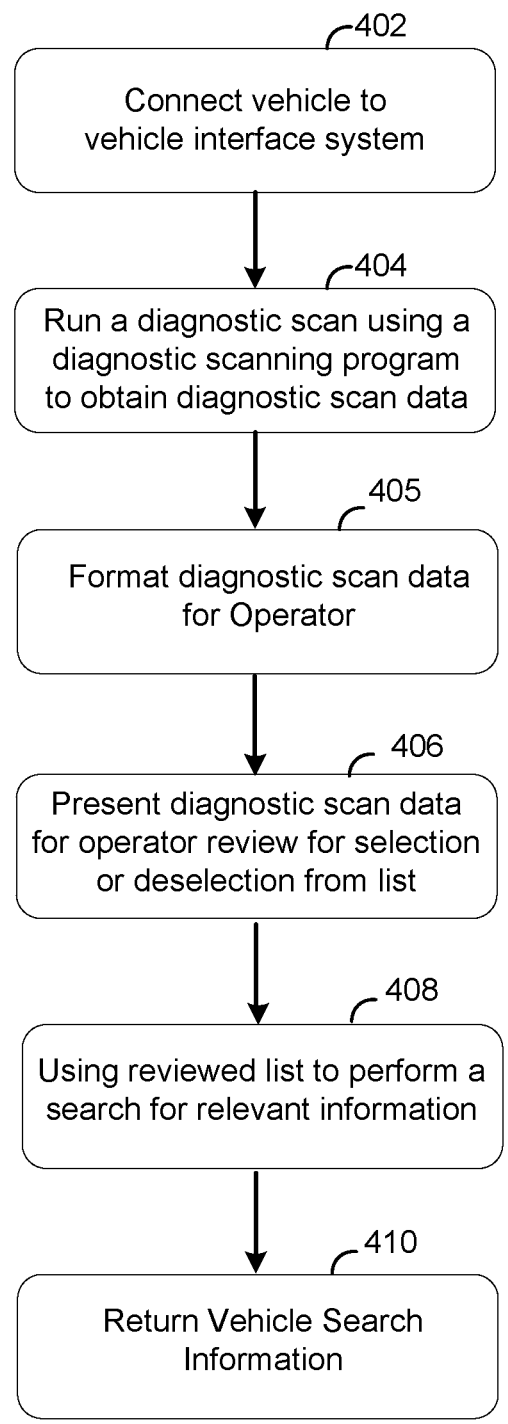
FIG. 5 is a flow diagram illustrating steps to a method for manually assessing an electronic system of a vehicle for maintenance needs and performing a search for relevant information in accordance with the present invention.

FIG. 5 is a flow diagram illustrating the steps to a method for manually selecting relevant diagnostic scan data 26 for a search for maintenance/repair information. In step 402 of FIG. 5, a vehicle 22 to be evaluated is communicatively coupled to a vehicle diagnostic tool 28 via a vehicle cable 43. In step 404 of FIG. 5, a diagnostic scan is run using a diagnostic scanning program. For example, an OEM supplied diagnostic scanning program 53*a* or an aftermarket diagnostic scanning program 53*b* is used to scan the electronic system 23 of vehicle 22. The scan sends queries to the electronic system 23 of vehicle 22, which is responded to by a plurality of ECUs on the vehicle 22. In step 405 of FIG. 5, the diagnostic scan data 26 obtained via step 404 may be processed for formatting. As discussed above, the diagnostic scan data 26 is processed using scan data identification program 53d to format the diagnostic scan data 26 for presenting to the operator 24. In step 406 of FIG. 5, the diagnostic scan data 26 is presented to a mechanic or operator 24, such as in the form of a list 25 of fault code DTCs for review and for selection (selection or deselection) of individual diagnostic scan data 26 by the operator 24. The selection (or deselection) of individual diagnostic scan data 26 may be based upon a variety of factors as determined by the mechanic/operator 24. For example, the mechanic/operator's selection or deselection of diagnostic scan data 26 from the review list 25 may be based upon their professional/technical knowledge of the associations between DTCs, the relevance of DTCs with respect to each other, and knowledge of selected DTCs of interest, for example, the vehicle 22 may have been scanned as part of a repair effort to deal with a transmission issue, which would mean that the knowledgeable mechanic/operator 24 would understand that some DTCs would be obviously irrelevant and extraneous, such as, DTCs related to satellite radio, engine misfires, emissions ECUs, and the like. With certain DTCs selected whereby extraneous/irrelevant DTCs are unselected, the list of DTCs has been reviewed. The reviewed list 25 is then used to perform a search for relevant maintenance and/or repair information as illustrated in step 408 of FIG. 5, where the reviewed list 25 is used to perform a search for relevant maintenance/repair information related to the selected individual diagnostic scan data 26. By removing irrelevant diagnostic scan data 26, the search results will be focused on just those fault code DTCs for which the mechanic/operator 24 desires to obtain results. Step 410 in FIG. 5 illustrates the return of relevant vehicle search information, such as to diagnostic tool 28.

FIG. 6 is a flow diagram illustrating the steps to a method for automatically reviewing and selecting diagnostic scan data 26 for a search for maintenance/repair information. In step 502 of FIG. 6, a vehicle to be evaluated is communicatively coupled to a vehicle diagnostic tool 28 via a vehicle cable 43. In step 504 of FIG. 5, a diagnostic scan is run using a diagnostic scanning program. For example, an OEM supplied diagnostic scanning program 53a or an aftermarket diagnostic scanning program 53b is used to scan the electronic system 23 of vehicle 22. The scan sends queries to the electronic system 23 of vehicle 22, which is responded to by a plurality of ECUs on the vehicle 22. In step 505, search or review criteria are entered into diagnostic tool 28. This may comprise keywords related to an issue being diagnosed by operator 24, or may include date limitations or ranges entered into tool 28 based on when a problem arose or intended to exclude older or preexisting fault code diagnostic scan data 26. In step 506 of FIG. 6, the obtained diagnostic scan data 26 is automatically processed, such as via scan code selection program 53c. to select individual diagnostic scan data 26 relevant to the criteria entered at step 505. For example, if the vehicle 22 has come for service related to a recent mechanical issue, the computer can automatically search for DTCs with older timestamps and deselect them. Whether a timestamp can be considered "old" by the algorithm could be based upon a selected time interval (e.g., days, weeks, or months). If the timestamp of a DTC is beyond the set time interval, it is deselected.

As discussed herein, the automatic review could also be based upon known associations or disassociations between any of the DTCs in the list of DTCs. If the list of DTCs include a DTC for a wheel or brake issue and another DTC for a transmission issue, because there is no relationship between the wheel/brake issues and the transmission issue, one or the other could be automatically deselected from the list of DTCs if one or the other is manually selected for inclusion in the list of DTCs. Thus, if a DTC has been selected for inclusion in the list of DTCs, the algorithm could automatically review a list of DTCs that are known to be unassociated with the selected DTC, such that if any of them were included in the list of DTCs, those unassociated DTCs would be deselected.

With certain DTCs selected and all (or substantially all) extraneous/irrelevant DTCs unselected, the list of DTCs has been reviewed. In step 508 of FIG. 6, the reviewed list is used to perform a search for relevant maintenance/repair information related to the selected diagnostic scan data 26. By removing the irrelevant diagnostic scan data 26, the search results will be focused on just those fault code DTCs for which the mechanic/operator 24 desires to obtain results. Step 510 in FIG. 6 illustrates the return of relevant vehicle search information, such as to diagnostic tool 28.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments, the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle diagnostic tool 28 is disclosed as including diagnostic scanning programs 53a, 53b, scan code selection program 53c, and scan data identification program 53d. It should be appreciated that alternative arrangements may be employed within the scope of the present invention. For example, one or more of the various programs may reside on different devices, such as for example on remote computer 64. Still further, although diagnostic scanning programs 53a, 53b, scan code selection program 53c, and scan data identification program 53d, one or more of such programs may be combined together and operate as subroutines. Diagnostic tool 28 in the illustrated embodiment is disclosed as an integrated device with vehicle interface 27 and computer module 30 being contained within housing 28. Alternatively, however, vehicle interface 27 and computer 30 may be separate devices, with computer 30 configured as a laptop, tablet or other computing device.

Diagnostic tool 28 may, either in addition to the above noted various loaded diagnostic scanning applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

System 10, in addition to performing scanning operations, may also be used for reprogramming of vehicle 22, such as reprogramming selected ECUs, including reprogramming ECUs based on a determination of fault codes.

Thus, an exemplary vehicle diagnostic tool 28 is plugged into a vehicle 22. A particular diagnostic scan program 53a, 53b is selected, and the vehicle 22 is scanned. The DTCs that are reported by the ECUs of the vehicle 22 are received by the vehicle diagnostic tool 28 and are presented in a report to the mechanic/operator 24 with the standard format with code and title format. Whether a manual review and/or an automatic review, the list of DTCs is reviewed for irrelevant DTCs. Under a manual review, the mechanic/operator 24 can deselect DTCs that they are aware are unrelated to the issue they are investigating. Once the review is complete, the "reviewed list" of DTCs is used as search criteria for a search. As discussed, this search provides additional mechanical/repair information to the mechanic/operator 24. The returned mechanical/repair information is thus tailored to include information directed to an issue under investigation because extraneous or irrelevant diagnostic data is removed (deselected) from the search criteria.

Changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A method of diagnosing a vehicle electronic system and searching for relevant vehicle information pertaining thereto, said method comprising:
   providing a vehicle diagnostic system comprising a vehicle diagnostic computer tool configured to operate in a mode to scan a vehicle to obtain diagnostic scan data;
   connecting the vehicle diagnostic computer tool with a diagnostic port of the vehicle to be in communication with an electronic system of the vehicle;
   obtaining a plurality of diagnostic scan data results from the electronic system of the vehicle with the vehicle diagnostic computer tool using a diagnostic scanning program;
   entering input criteria data by an operator to the vehicle diagnostic computer tool directed to a vehicle issue;
   automatically designating particular ones of the diagnostic scan data results by the vehicle diagnostic computer tool based on the input criteria data and known associations or dissociations of the diagnostic scan data results to the input criteria data;
   performing a search for vehicle information as defined by the designated particular ones of the diagnostic scan data results;
   displaying the vehicle information resulting from the search on a display of the vehicle diagnostic computer tool.

2. The method of claim 1, further comprising providing a list of the plurality of diagnostic scan data results on a display of the vehicle diagnostic computer tool, and further comprising selecting additional designated ones of the diagnostic scan data by an operator via the vehicle diagnostic computer tool.

3. The method of claim 1, further comprising formatting the plurality of diagnostic scan data results prior to providing a list of the plurality of diagnostic scan data results on the display of the vehicle diagnostic computer tool.

4. The method of claim 3, wherein the plurality of diagnostic scan data results comprise alphanumeric codes, and wherein said formatting comprises assigning titles to the plurality of diagnostic scan data results.

5. The method of claim 1, wherein said performing the search for vehicle information comprises using the vehicle diagnostic computer tool to search for vehicle information.

6. The method of claim 1, wherein the vehicle information of said performing the search for vehicle information related to the selected particular ones of the diagnostic scan data results comprises repair and/or maintenance information.

7. The method of claim 1, wherein the vehicle diagnostic computer tool includes an internet interface for accessing a remote computer, and wherein said performing the search for vehicle information related to the designated particular ones of the diagnostic scan data results comprises searching via the internet.

8. The method of claim 1, wherein the vehicle diagnostic computer tool includes a database of vehicle information, and wherein said performing the search for vehicle information related to the designated particular ones of the diagnostic scan data results comprises accessing said database for vehicle information.

9. The method of claim 1, wherein said automatically designating particular ones of the diagnostic scan data results using the vehicle diagnostic computer tool comprises either selecting particular ones of the diagnostic scan data results to submit for searching or deselecting particular ones of the diagnostic scan data results that are removed from searching.

10. The method of claim 1, wherein the input criteria data comprises a keyword.

11. The method of claim 1, further comprising obtaining with the vehicle diagnostic computer tool vehicle identifier information comprising at least one of the (i) vehicle make, (11) vehicle make and model, or (iii) vehicle make, model and year, and wherein said performing a search for vehicle information related to the designated particular ones of the diagnostic scan data results comprises performing the search based on the vehicle identifier information.

12. The method of claim 1, wherein the input criteria data comprises any one or more of a date or a date and time, date limitations or ranges based on when a problem with the vehicle began, known dissociations or associations between ones of the diagnostic data scan results, and keywords related to an issue being diagnosed by the operator.

13. The method of claim 1, wherein the vehicle issue comprises a problem with the vehicle that is being diagnosed by the operator.

14. A vehicle diagnostic system configured for diagnosing a vehicle electronic system and searching for relevant vehicle information pertaining thereto, said vehicle diagnostic system comprising:
   a vehicle diagnostic computer tool configured to operate in a mode to scan an electronic system of a vehicle to obtain diagnostic scan data;

a diagnostic scanning program configured for use with the vehicle diagnostic computer tool to obtain a plurality of diagnostic data scan results from the electronic system of the vehicle;

wherein said vehicle diagnostic computer tool is configured to receive from an operator input criteria data directed to a vehicle issue;

wherein said vehicle diagnostic computer tool is configured to automatically designate particular ones of the plurality of diagnostic data scan results for searching based on the input criteria data and known associations or dissociations of the diagnostic scan data results to the input criteria data, wherein said vehicle diagnostic computer tool is configured to enable searching for vehicle information as defined by the designated ones of the plurality of diagnostic data scan results, and wherein said vehicle diagnostic computer tool is configured to display the vehicle information resulting from the search on a display.

15. The vehicle diagnostic system of claim 14, wherein said vehicle diagnostic computer tool includes a display and is configured to list the obtained plurality of diagnostic data scan results on said display, and wherein said vehicle diagnostic computer tool is configured to enable an operator to designate additional selected ones of the plurality of diagnostic data scan results.

16. The vehicle diagnostic system of claim 15, wherein said vehicle diagnostic computer tool includes a scan data identification program, and wherein said scan data identification program is configured to format the plurality of diagnostic data scan results to include identification information for displaying on said display.

17. The vehicle diagnostic system of claim 14, wherein said vehicle diagnostic computer tool includes a scan code selection program, and wherein said scan code selection program is configured to perform the automatic designation of particular ones of the plurality of diagnostic data scan results for searching based on the input criteria data.

18. The vehicle diagnostic system of claim 14, wherein the input criteria data comprises any one or more of a date or a date and time, date limitations or ranges based on when a problem with the vehicle began, known dissociations or associations between ones of the diagnostic data scan results, and keywords related to an issue being diagnosed by the operator.

19. The vehicle diagnostic system of claim 14, wherein the vehicle issue comprises a problem with the vehicle that is being diagnosed by the operator.

* * * * *